(12) United States Patent
Kotecha et al.

(10) Patent No.: US 9,113,311 B2
(45) Date of Patent: Aug. 18, 2015

(54) MULTICAST/BROADCAST CONTENT DELIVERY BASED ON FEEDBACK FROM A USER DEVICE

(75) Inventors: Lalit R. Kotecha, San Ramon, CA (US); Sergio Aguirre, Southlake, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 307 days.

(21) Appl. No.: 13/467,454

(22) Filed: May 9, 2012

(65) Prior Publication Data

US 2013/0301424 A1 Nov. 14, 2013

(51) Int. Cl.
| H04L 12/28 | (2006.01) |
| H04W 4/06 | (2009.01) |
| H04L 29/06 | (2006.01) |
| H04W 76/00 | (2009.01) |

(52) U.S. Cl.
CPC ............. *H04W 4/06* (2013.01); *H04L 65/4076* (2013.01); *H04L 65/602* (2013.01); *H04L 65/80* (2013.01); *H04W 76/002* (2013.01)

(58) Field of Classification Search
None
See application file for complete search history.

(56) References Cited

U.S. PATENT DOCUMENTS

| 6,457,037 | B1 * | 9/2002 | Maytal | 718/100 |
| 8,599,700 | B2 * | 12/2013 | Chen et al. | 370/241 |
| 2006/0280205 | A1 * | 12/2006 | Cho | 370/473 |
| 2010/0005360 | A1 * | 1/2010 | Begen et al. | 714/751 |
| 2010/0122141 | A1 * | 5/2010 | Arye | 714/752 |
| 2010/0189025 | A1 * | 7/2010 | Cheng | 370/312 |
| 2010/0246429 | A1 * | 9/2010 | Hwang et al. | 370/252 |
| 2010/0246471 | A1 * | 9/2010 | Chen et al. | 370/312 |
| 2010/0296427 | A1 * | 11/2010 | Lohr et al. | 370/312 |
| 2011/0026623 | A1 * | 2/2011 | Srinivasa et al. | 375/260 |
| 2011/0044213 | A1 * | 2/2011 | Venkatachalam et al. | 370/277 |
| 2013/0163444 | A1 * | 6/2013 | Tee et al. | 370/252 |

OTHER PUBLICATIONS

Wikipedia: "IP multicast" retrieved online Apr. 17, 2012 at http://en.wikipedia.org/wiki/IP_multicast, 5 pages.

* cited by examiner

*Primary Examiner* — Kwang B Yao
*Assistant Examiner* — Hardikkumar Patel

(57) ABSTRACT

A user device may receive a portion of multicast content and may obtain transmission information associated with the portion of the multicast content. The transmission information may identify parameters or radio conditions under which the portion of the multicast content is being received by the user device. The user device may provide, to a server device, the transmission information, and may receive content that remedies a condition, associated with the portion of the multicast content. The condition may be detected, by the server device, based on the transmission information.

20 Claims, 12 Drawing Sheets

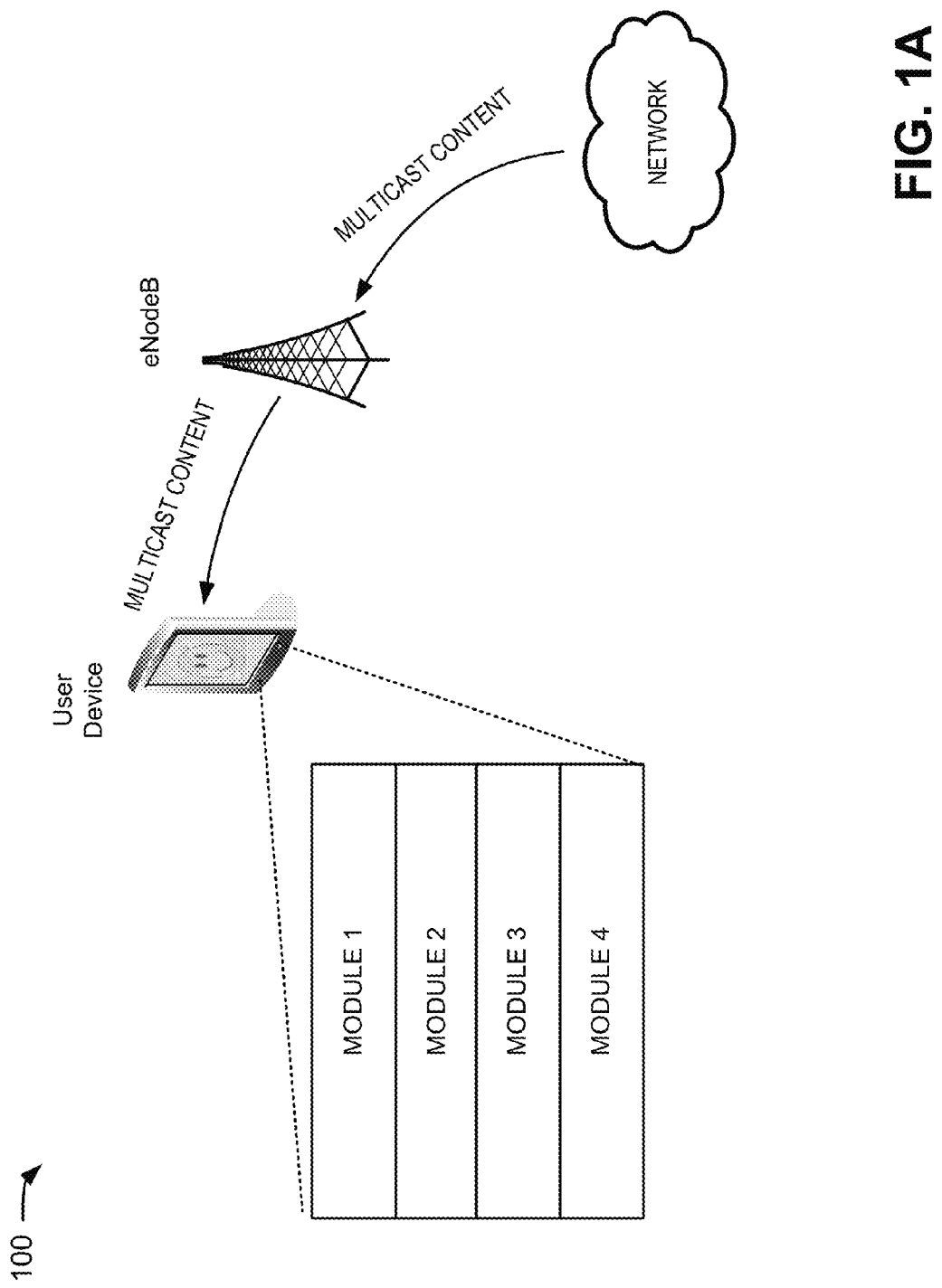

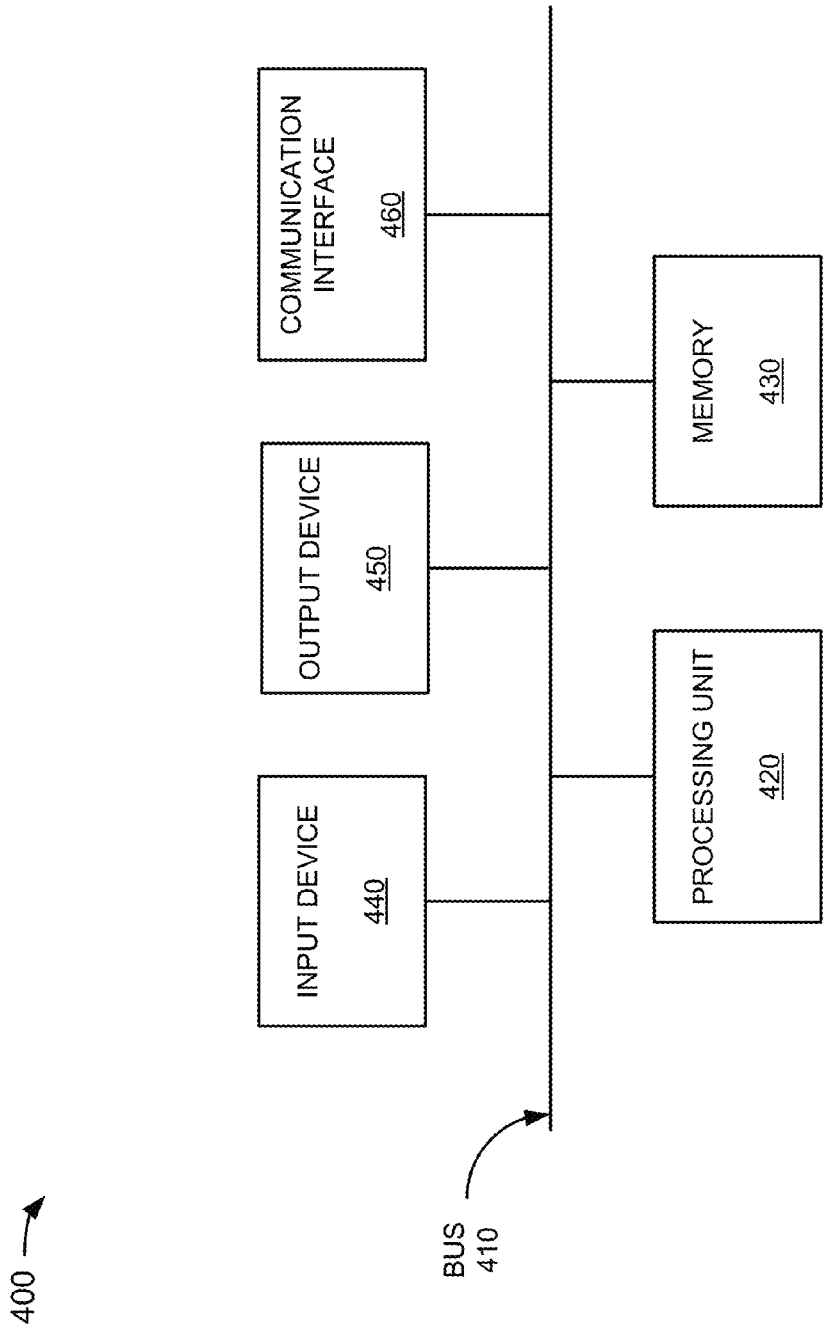

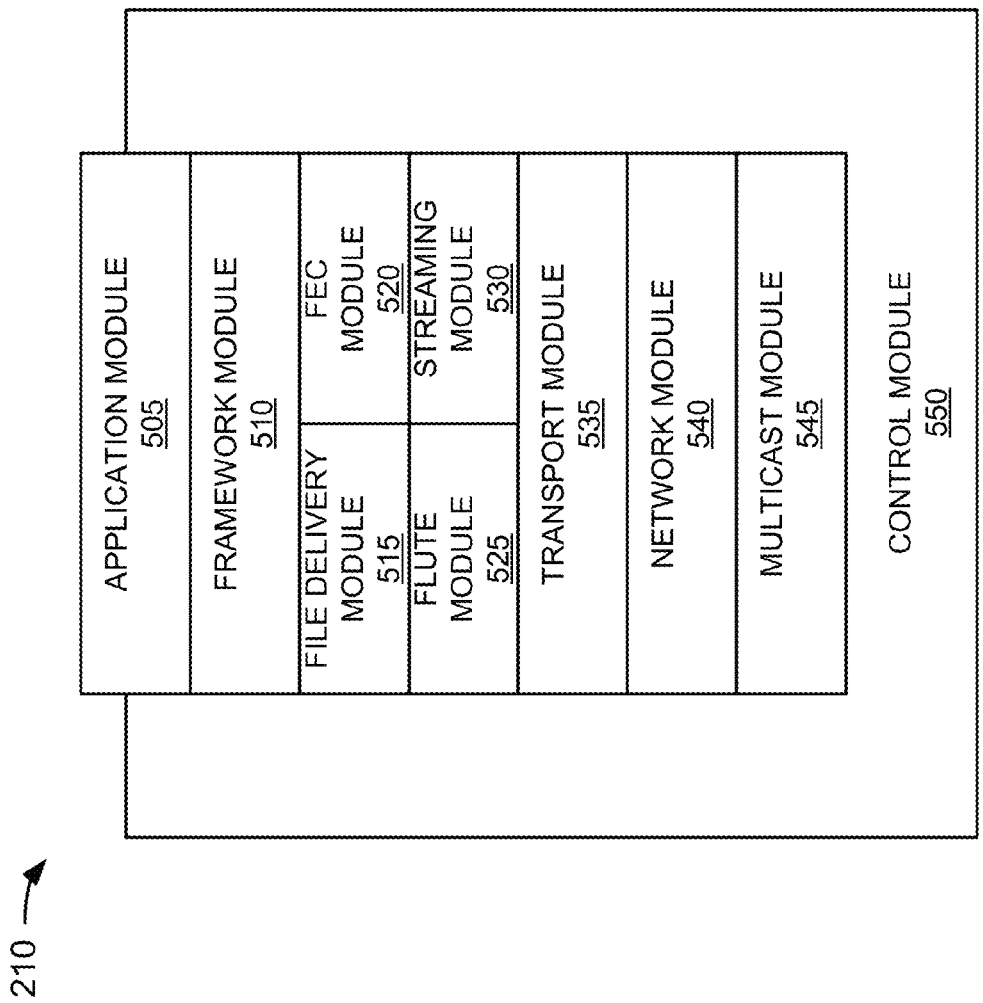

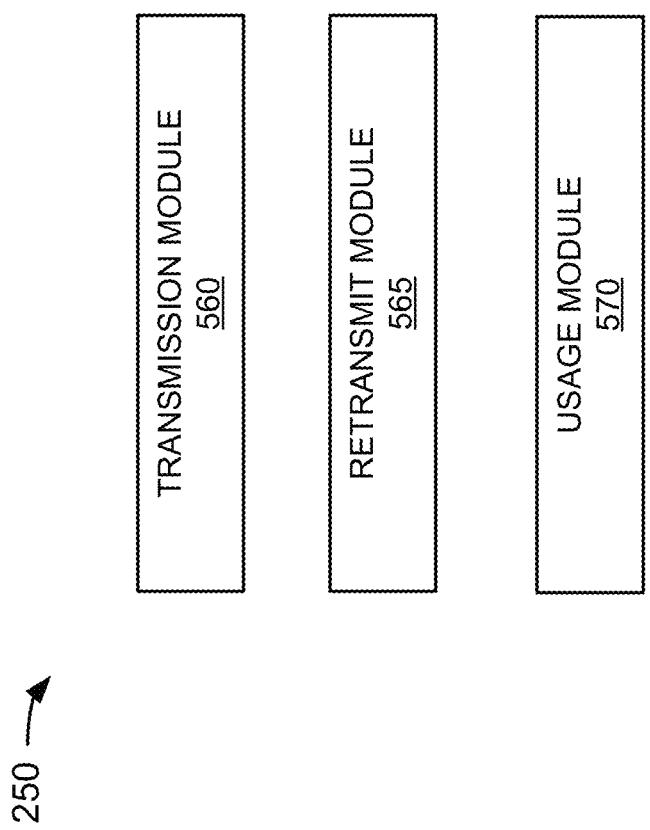

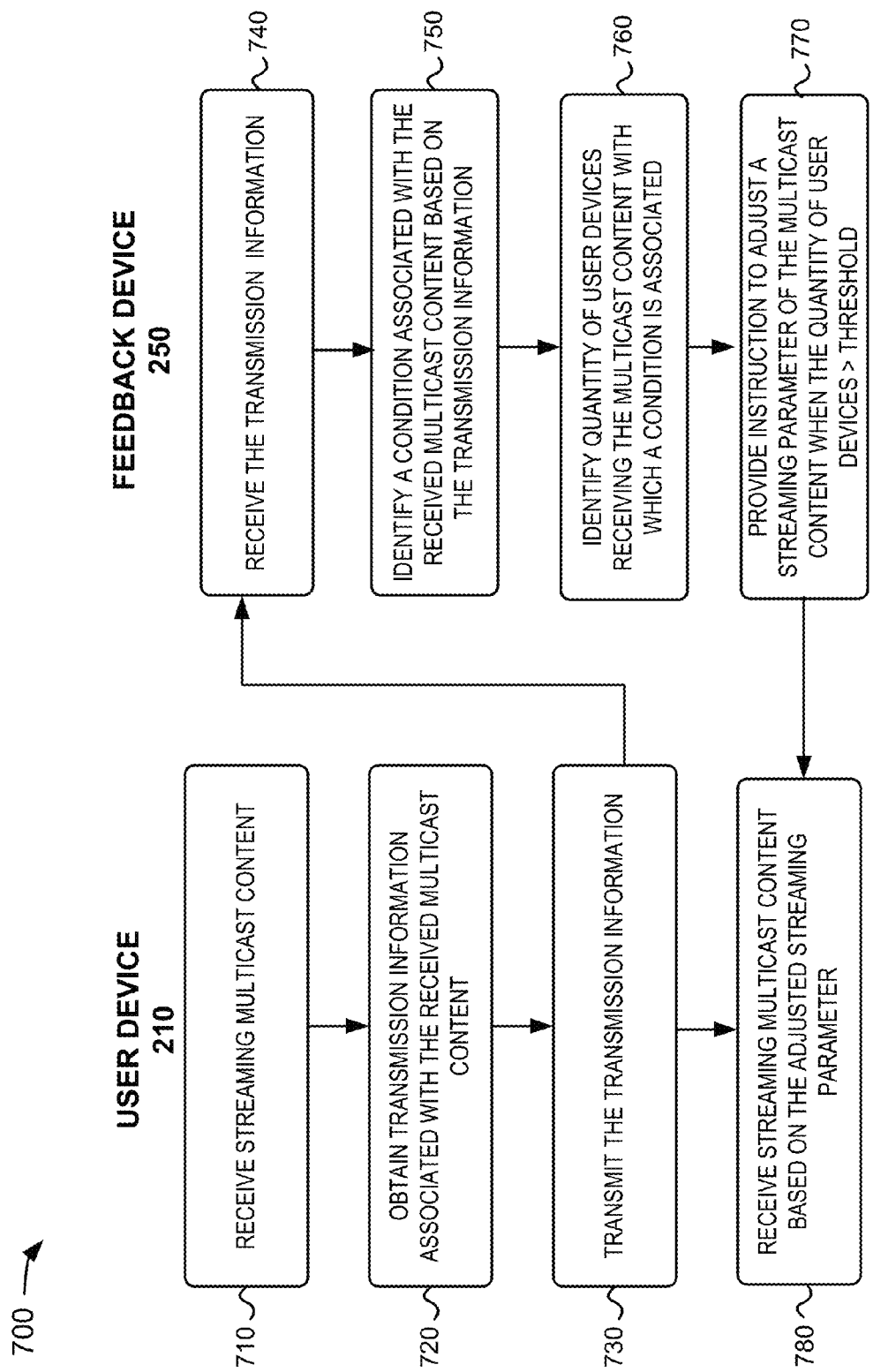

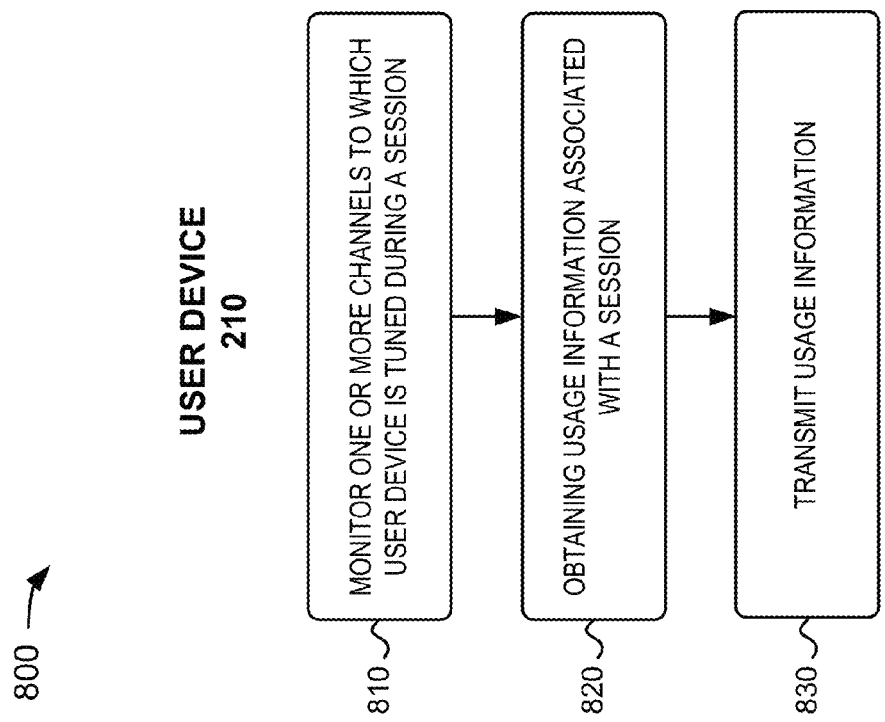

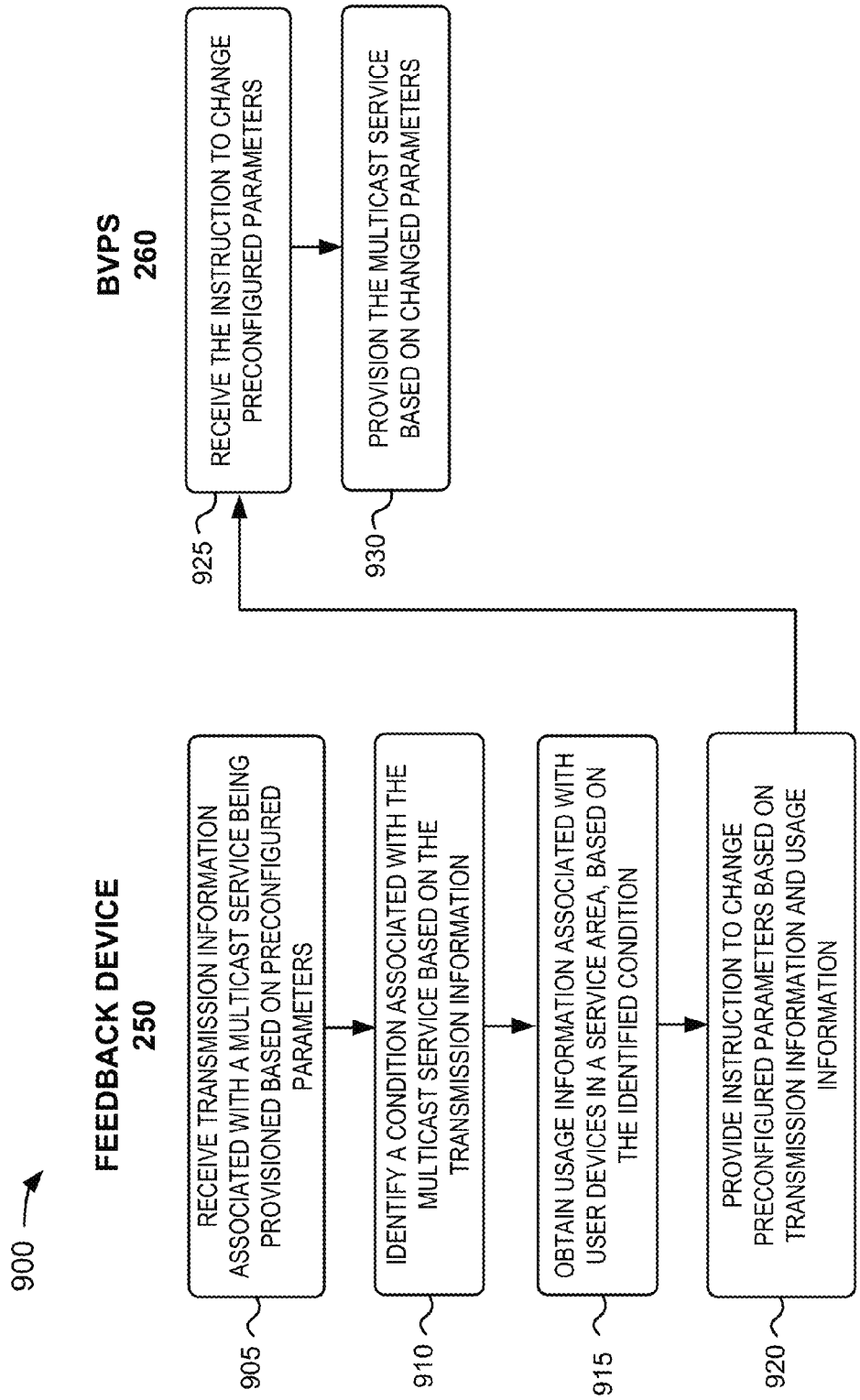

MULTICAST/BROADCAST CONTENT DELIVERY BASED ON FEEDBACK FROM A USER DEVICE

BACKGROUND

Evolved multimedia broadcast multicast services (eMBMS) include a point-to-multipoint (PMP) interface specification for existing and upcoming Third Generation Partnership Project (3GPP) cellular networks. eMBMS are designed to provide efficient delivery of broadcast and multicast services.

BRIEF DESCRIPTION OF THE DRAWINGS

FIGS. 1A, 1B, and 1C are diagrams illustrating an overview of an example implementation described herein;

FIG. 4 is a diagram of example components of a device that may correspond to one of the devices of the environment of FIG. 2;

FIGS. 5A and 5B are diagrams of example functional components of the user device of FIG. 2;

FIG. 7 is a flow chart of an example process for streaming multicast content based on feedback received from a user device;

FIG. 8 is a flow chart of an example process for collecting and providing usage information associated with a user device; and FIG. 9 is a flow chart of an example process for provisioning a multicast service based on feedback received from a user device.

DETAILED DESCRIPTION OF PREFERRED EMBODIMENTS

The following detailed description refers to the accompanying drawings. The same reference numbers in different drawings may identify the same or similar elements.

Systems and/or methods described herein may provide multicast content to a user device based on feedback received from the user device. The feedback may identify information associated with the multicast content being received by the user device. The feedback may enable a condition, associated with the multicast content, to be detected and the multicast content to be provided, to the user device, in a manner that remedies the condition. In the description below, multicast content is to be interpreted broadly to include multicast content and/or broadcast content.

While the following description focuses on the 3GPP Long Term Evolution (LTE) standard, systems and/or methods, described herein, may be equally applicable to other wireless standards.

FIG. 1A is a diagram illustrating an overview of an example implementation 100 described herein. Assume, for example implementation 100, that a standard user device receives content, via a multicast channel (e.g., shown as multicast content), from a network and via an eNodeB as illustrated in FIG. 1A. Assume further that the standard user device uses modules (e.g., shown as modules 1 through 4) to receive, process, and/or display the multicast content based on a type of multicast content (e.g., text, video, audio, etc.); a manner in which the content is received (e.g., via streaming media, download, file transfer, etc.); protocols used to transmit and/or process the content (e.g., Internet protocol (IP), transmission control protocol (TCP), user datagram protocol (UDP), etc.); a transmission method (e.g., unicast, multicast, broadcast, etc); etc. A condition may be associated with the multicast content (e.g., lost data, uncorrectable errors, poor signal strength, low data rates, etc.) that degrades a user experience when the content is displayed or played on the standard user device.

Figure 1B:
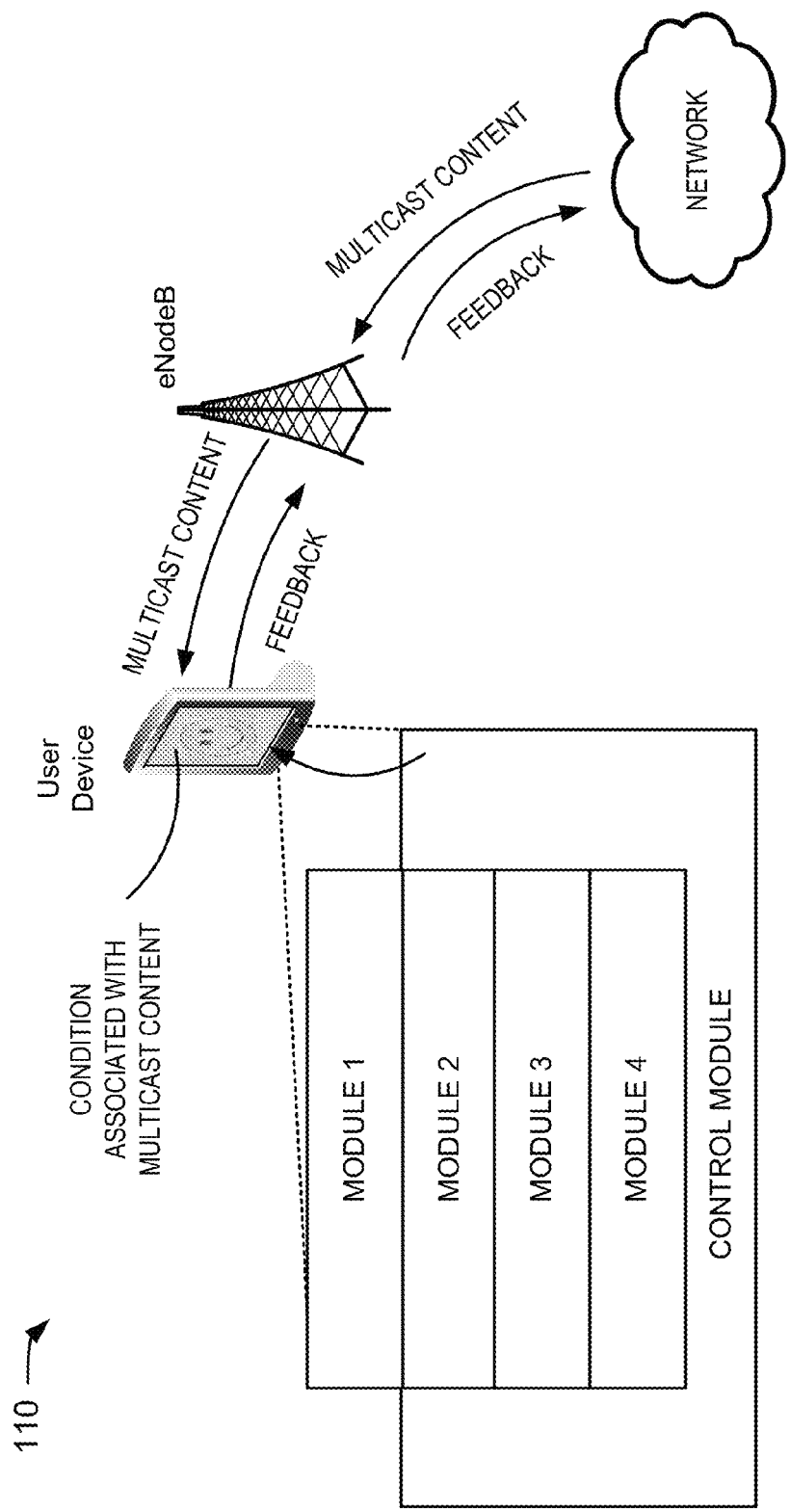
Figure 1C:
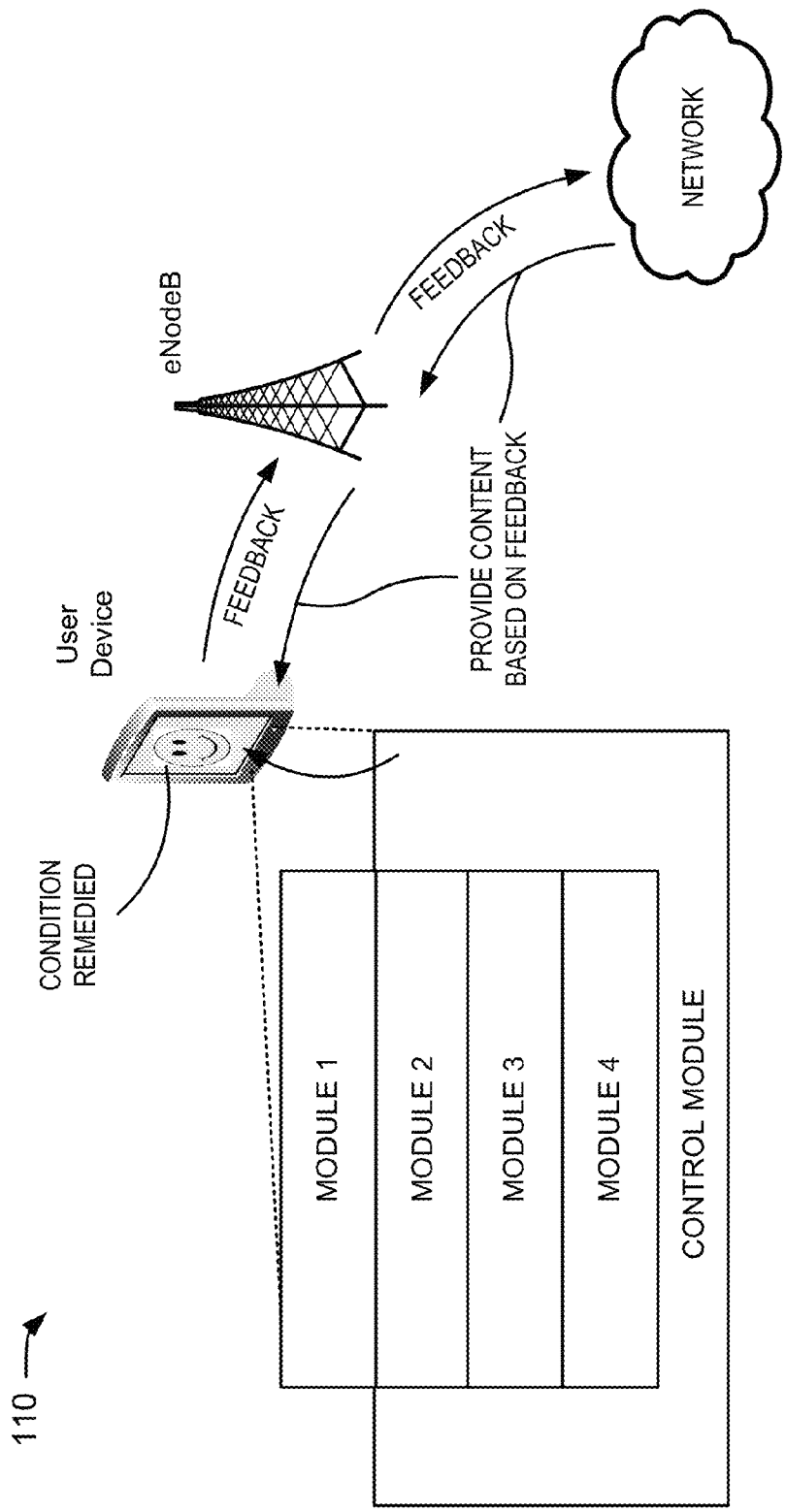

FIGS. 1B and 1C are diagrams illustrating an overview of an example implementation 110 described herein. As illustrated in FIG. 1B, a user device may host a control module that can communicate with the modules (e.g., modules 1-4) that are hosted by the user device. The control module may represent logic implemented as hardware or a combination of hardware and software (e.g., as a middleware application, etc.). Assume, for example implementation 110, that the user device receives multicast content from a network, via an eNodeB, as illustrated in FIG. 1B. Assume further that the user device uses one or more of the modules to receive, process, and/or display the multicast content in a manner similar to that described above with respect to FIG. 1A. In this example, the user device may use the control module to communicate with one or more of the modules to obtain information associated with the received multicast content (e.g., bandwidth, data rate, lost data, errors, channels used, etc.). Additionally, or alternatively, the user device may use the control module to provide, as feedback to the network, the information associated with the received multicast content. The network may use the feedback to determine whether a condition is associated with the multicast content and may provide content (e.g., as multicast content or unicast content) to the user device in a manner that remedies the condition, as shown in FIG. 1C.

Figure 2:
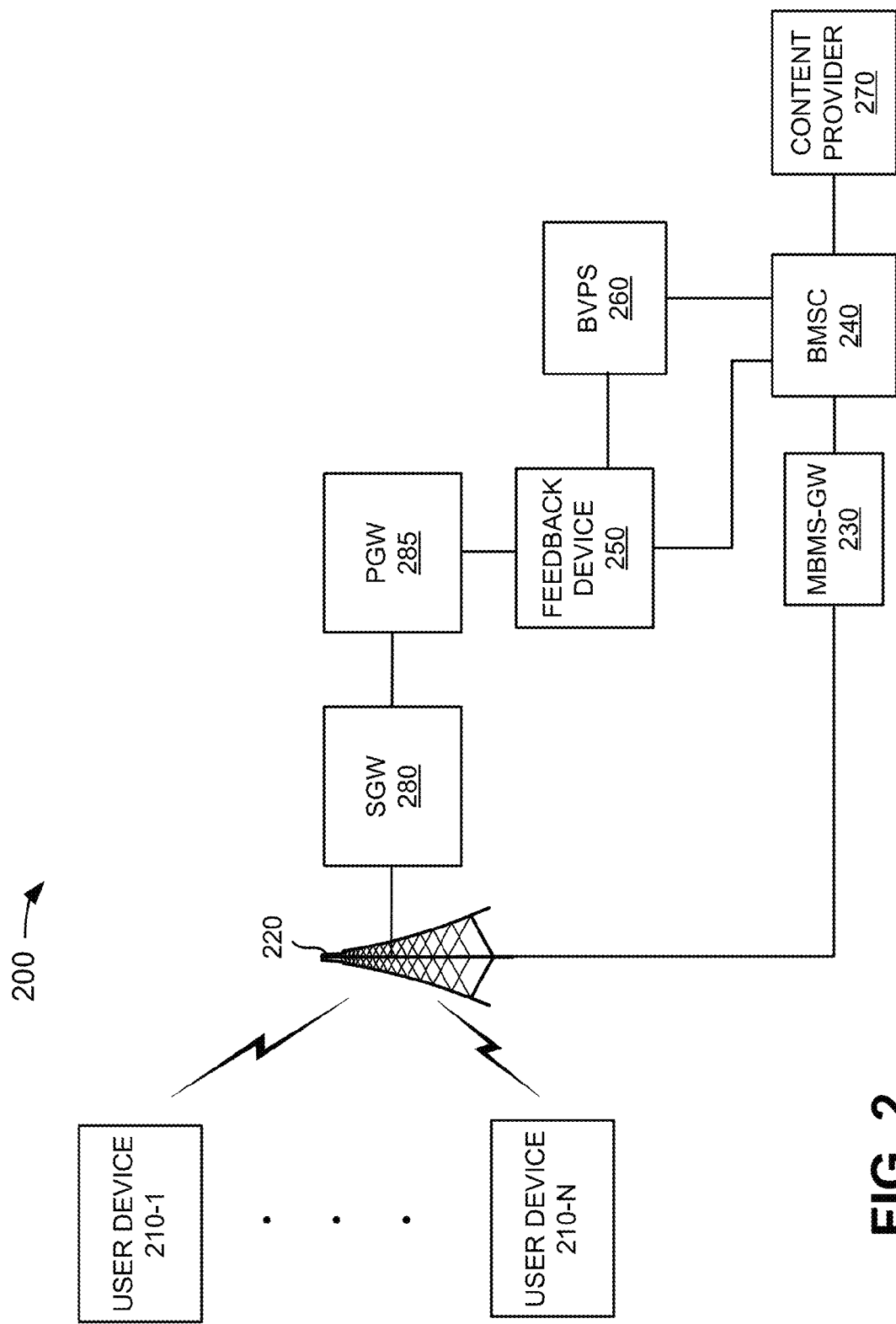
FIG. 2 is a diagram of an example environment in which systems and/or methods described herein may be implemented.

FIG. 2 is a diagram of an example environment 200 in which systems and/or methods described herein may be implemented. As illustrated, environment 200 may include a group of user devices 210-1 through 210-N (where N≥1) (which may be referred to collectively as "user devices 210" and individually as "user device 210"), an eNodeB 220, a Multimedia Broadcast/Multicast Service Gateway (MBMS-GW) 230, a Broadcast/Multicast Services Center (BMSC) 240, a feedback device 250, a Broadcast Video Provisioning System (BVPS) 260, a content provider 270, a serving gateway (SGW) 280, and a packet data network (PDN) gateway (PGW) 285. Components of environment 200 may interconnect via wired and/or wireless connections. For example, user device 210 may wirelessly connect to one or more eNodeBs 220. MBMS-GW 230, BMSC 240, feedback device 250, BVPS 260, content provider 270, SGW 280, and PGW 285 may interconnect via wired and/or wireless connections.

User device 210 may include any computation and communication device that is capable of communicating with eNodeB 220. For example, user device 210 may include a radiotelephone, a personal communications system (PCS) terminal (e.g., that may combine a cellular radiotelephone with data processing and data communications capabilities); a personal digital assistant (PDA) (e.g., that can include a radiotelephone, a pager, Internet/intranet access, etc.); a laptop computer; a personal computer; tablet computer; a set-top box (STB); a television; a camera; a personal gaming system; or another type of computation and communication device. User device 210 may, for example, receive, process, and/or display unicast content and/or multicast content received from MBMS-GW 230 via eNodeB 220.

User device 210 may also, or alternatively, collect transmission information associated with receiving and/or processing multicast content being received (e.g., by downloading a file, receiving a media stream, etc.) by user device 210. The transmission information may, for example, include indicators that identify radio conditions (e.g., an amount of signal strength, bandwidth, etc.) under which the multicast content is received and/or a level of quality associated with the multicast content (e.g., a quantity of errors, dropped packets, packets received out-of-order, lost error correction symbols, etc.). User device 210 may also, or alternatively, collect usage information that includes, for example, channels that are tuned to by user device 210, a duration during which a channel is tuned, a quantity of times a video frame stops playing (e.g., freezes), a duration during which the video frame freezes, etc. In one example implementation, user device 210 may include a control module, to be described in greater detail below in FIG. 5A, that enables user device 210 to collect transmission information and/or usage information for delivery to feedback device 250.

eNodeB 220 may include one or more wireless transmission devices that provide unicast and multicast services to user device 210. For example, eNodeB 220 may include one or more devices that wirelessly receive information (e.g., video, voice, data, etc.) from user device 210 and transmit that information to other components in environment 200, including another user device 210. eNodeB 220 may also include one or more devices that receive content from content provider 270 and wirelessly transmit the content, to user device 210, as unicast content and/or multicast content. eNodeB 220 may also, or alternatively, include one or more devices that receive feedback from user device 110 (e.g., that includes usage information and/or transmission information) and provides the feedback to feedback device 250. eNodeB 220 may also, or alternatively, include one or more devices that control transmission parameters associated with transmitted multicast content based on an instruction received from feedback device 250. The transmission parameters may include, for example, a modulation coding scheme (MCS) value, a type of modulation, a data rate, a channel bandwidth, etc.

MBMS-GW 230 may include one or more devices that gather, process, and/or provide information in a manner described herein. For example, MBMS-GW 230 may include a server device or another type of network device. In an example implementation, MBMS-GW 230 may include a point-to-multipoint interface that provides delivery of multicast broadcast services to one or more eNodeBs 220.

BMSC 240 may include one or more devices that gather, process, and/or provide information in a manner described herein. For example, BMSC 240 may include a server device or another type of network device. In an example implementation, BMSC 240 may control a quantity of error correction symbols (e.g., forward error correction (FEC) overhead) to be included within multicast content and/or unicast content being provided to eNodeB 220 for delivery to user device 110. BMSC 240 may, for example, control the FEC overhead to improve a level of quality, associated with the multicast content or unicast content, based on an instruction received from feedback device 250. Additionally, BMSC 240 may retransmit content, previously transmitted as unicast content and/or multicast content, based on an instruction received from feedback device 250.

Feedback device 250 may include one or more devices that gather, process, and/or provide information in a manner described herein. For example, feedback device 250 may receive feedback from user device 210 (e.g., via eNodeB 220, SGW 280, and/or PGW 285) and may instruct eNodeB 220, BMSC 240, and/or BVPS 260 to transmit content, to user device 110, in a particular manner based on the feedback. For example, feedback device 250 may receive transmission information that identifies radio conditions and/or a level of quality associated with multicast content being received by user device 110 and may instruct eNodeB 220 to modify transmission parameters, associated with the multicast content, to improve the radio conditions and/or the level of quality. Feedback device 250 may also, or alternatively, instruct BMSC 240 to adjust FEC overhead, associated with the multicast content, to improve the level of quality.

Additionally, or alternatively, feedback device 250 may, based on the transmission information, instruct BMSC 240 to retransmit content (e.g., as unicast or multicast content), to user device 210, when content received by user device 210 cannot be processed (e.g., due to dropped packets, lost FEC symbols, etc.). Additionally, or alternatively, feedback device 250 may instruct BVPS 240 to modify video service parameters, associated with a targeted service area, based on usage information and/or transmission information received from user devices 210 located within the targeted service area. In the description below, feedback device 250 is described as receiving information directly from user device 210 and/or from eNodeB 220 for simplicity. In another example, feedback device 250 may receive information indirectly from user device 210 via eNodeB 220, SGW 280, PGW 285, and/or some other device.

BVPS 260 may include one or more devices that gather, process, and/or provide information in a manner described herein. For example, BVPS 260 may include a server device or another type of network device. In an example implementation, BVPS 260 may configure eNodeB 220 to provide multicast content to user devices 210 within a geographic area (e.g., a service area). BVPS 260 may provide information, identifying the multicast content, to BMSC 240 to allow BMSC 240 to obtain the multicast content from content provider 270.

Content provider 270 may include one or more devices that gather, process, and/or provide information in a manner described herein. In one example, content provider 270 may include a computer system, an application, a cable head-end, and/or a broadcasting device capable of providing content (e.g., video content, audio content, applications, games, etc.). Content provider 270 may provide the content from a satellite feed, a cable television feed, an Internet content store, and/or from another source.

SGW 280 may include one or more network devices that gather, process, search, store, and/or provide information in a manner described herein. SGW 280 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 280 may, for example, aggregate traffic received from one or more eNodeBs 220 (e.g., transmission information, usage information, etc.) and may send the aggregated traffic to PGW 285.

PGW 285 may include one or more network devices that gather, process, search, store, and/or provide information in a manner described herein. PGW 285 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 285 may aggregate traffic received from one or more SGWs 130, etc.

and may send the aggregated traffic to a network. In one example, PGW 285 may receive traffic from SGW 280 and may provide the traffic (e.g., transmission information, usage information, etc.) to feedback device 250.

Although FIG. 2 shows example devices of environment 200, in other implementations, environment 200 may include fewer devices, different devices, differently arranged devices, or additional devices than those depicted in FIG. 2. Additionally, or alternatively, one or more devices of environment 200 may perform one or more tasks described as being performed by one or more other devices of environment 200.

Figure 3:
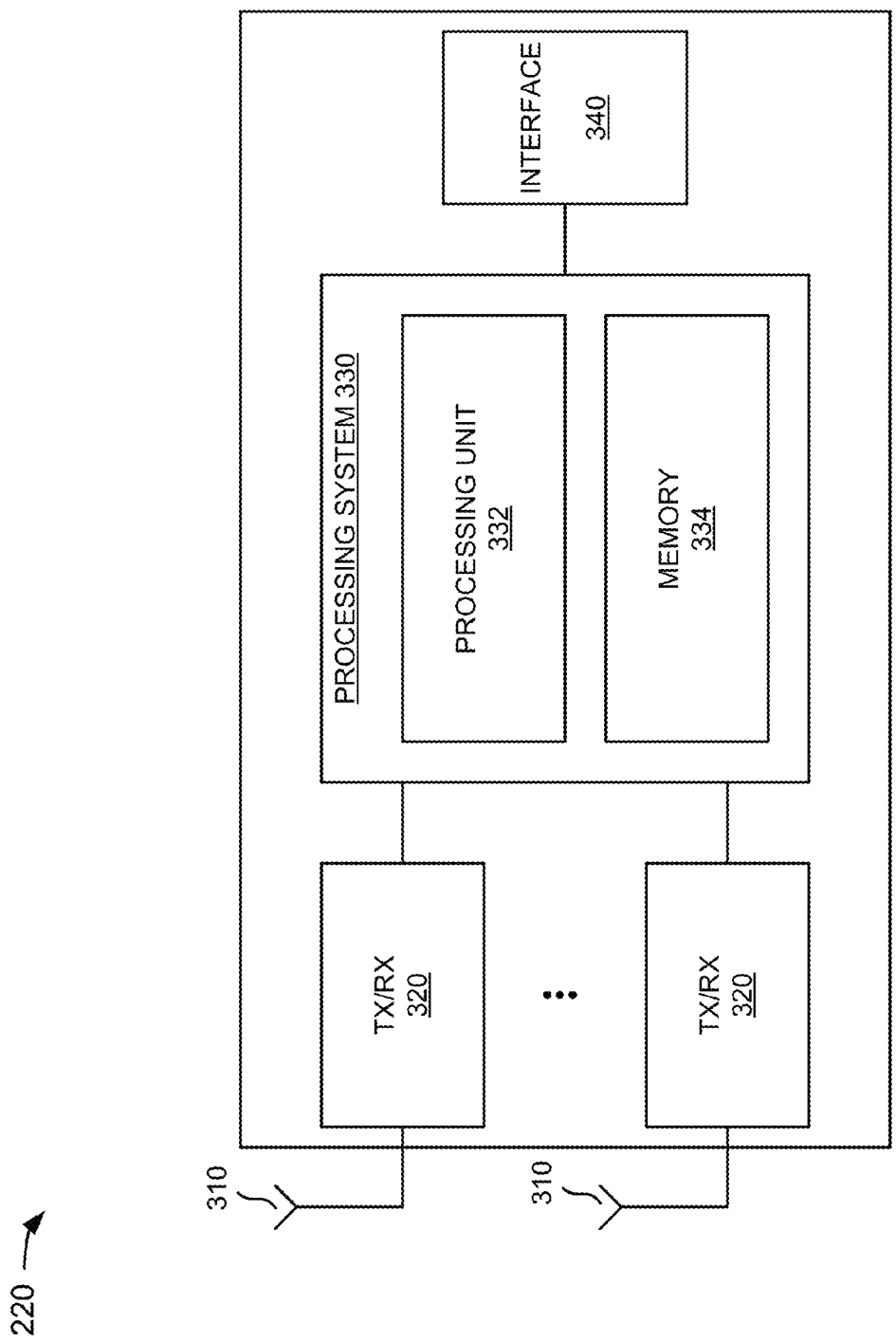
FIG. 3 is a diagram of example components of an eNodeB of FIG. 2.

FIG. 3 is a diagram of example components of eNodeB 220. As shown in FIG. 3, eNodeB 220 may include antennas 310, transceivers (TX/RX) 320, a processing system 330, and an interface 340.

Antennas 310 may include one or more directional and/or omni-directional antennas. Transceivers 320 may be associated with antennas 310 and may include transceiver circuitry for transmitting and/or receiving symbol sequences in a network via antennas 310.

Processing system 330 may control the operation of eNodeB 220. Processing system 330 may also process information received via transceivers 320 and/or interface 340. As illustrated in FIG. 3, processing system 330 may include a processing unit 332 and a memory 334. Processing unit 332 may include one or more processors, microprocessors, application specific integrated circuits (ASICs), field programmable gate arrays (FPGAs), or the like. Processing unit 332 may process information received via transceivers 320 and/or interface 340. In addition, processing unit 332 may transmit control messages and/or data messages, and may cause those control messages and/or data messages to be transmitted via transceivers 320 and/or interface 340. Processing unit 332 may also process control messages and/or data messages received from transceivers 320 and/or interface 340. Memory 334 may include a random access memory (RAM), a read-only memory (ROM), and/or another type of memory to store data and instructions that may be used by processing unit 332.

Interface 340 may include one or more line cards (or one or more other types of components) that allow eNodeB 220 to transmit data to and/or receive data from another eNodeB 220, MBMS-GW 230, and/or feedback device 250. In one example, interface 340 may enable eNodeB 220 to provide usage information and/or information identifying a level of quality, received from user device 210, to feedback device 250. Additionally, interface 340 may receive content, from MBMS-GW 230, to be provided to user device 210 as unicast content or multicast content.

As described herein, eNodeB 220 may perform certain operations in response to processing unit 332 executing software instructions contained in a computer-readable medium, such as memory 334. A computer-readable medium may be defined as a non-transitory memory device. A memory device may include memory space within a single physical memory device or spread across multiple physical memory devices. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of eNodeB 220, in other implementations, eNodeB 220 may include fewer components, different components, differently arranged components, or additional components than those depicted in FIG. 3. Additionally, or alternatively, one or more components of eNodeB 220 may perform one or more tasks described as being performed by one or more other components of eNodeB 220.

FIG. 4 is a diagram of example components of a device 400 that may correspond to one of the devices of environment 200. For example, device 400 may correspond to user device 210, MBMS-GW 230, BMSC 240, feedback device 250, BVPS 260, content provider 270, SGW 280, and/or PGW 285. In one example implementation, one or more of the devices of environment 200 may include one or more devices 400 or one or more components of device 400. As illustrated in FIG. 4, device 400 may include a bus 410, a processing unit 420, a memory 430, an input device 440, an output device 550, and a communication interface 460.

Bus 410 may permit communication among the components of device 400. Processing unit 420 may include one or more processors or microprocessors that interpret and execute instructions. Additionally, or alternatively, processing unit 420 may be implemented as or include one or more ASICs, FPGAs, or the like.

Memory 430 may include a RAM or another type of dynamic storage device that stores information and instructions for execution by processing unit 420, a ROM or another type of static storage device that stores static information and instructions for processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, a touch screen display, a biometric mechanism, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other components of environment 200.

As described herein, device 400 may perform certain operations in response to processing unit 420 executing software instructions contained in a computer-readable medium, such as memory 430. The software instructions may be read into memory 430 from another computer-readable medium or from another device via communication interface 460. The software instructions contained in memory 430 may cause processing unit 420 to perform processes described herein. Additionally, or alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Additionally, or alternatively, one or more components of device 400 may perform one or more tasks described as being performed by one or more other components of device 400.

FIG. 5A is a diagram of example functional components of user device 210. Each of the functional blocks, shown in FIG. 5A, may be implemented by one or more of the components described with regard to FIG. 4 (e.g., by processing unit 420 executing instructions stored in memory 430). As shown in FIG. 5A, user device 210 may include an application module 505, a framework module 510, a file delivery module 515, a forward error correction (FEC) module 520, a file delivery for unidirectional transport (FLUTE) module 525, a streaming module 530, a transport module 535, a network module 540, a multicast module 545, and a control module 550.

Application module 505 may represent one or more applications with which a user, associated with user device 110, interacts to receive content, play content (e.g., such as video content, audio content, etc.), execute content (e.g., such as a game or an executable application), and/or present content for display (e.g., text, images, etc.) on user device 110.

Framework module 510 may interact with application module 505 and/or one or more other modules to enable application module 505 to access the received content and/or to perform an operation on the received content (e.g., play, execute, display, etc.). For example, framework module 510 may communicate with streaming module 530 to allow application module 505 to access video content, received via a video stream, to be played on user device 210. Additionally, or alternatively, framework module 510 may interact with file delivery module 515 to allow application module 505 to access a file that has been downloaded to user device 210.

File delivery module 515 may process blocks of data, associated with files that are downloaded from one or more devices of environment 220. File delivery module 515 may, for example, divide a received block of data into one more segments. File delivery module 515 may also, or alternatively, examine packets (e.g., headers, trailers, payloads, etc.), within the segments, to identify dropped or delayed packets, reorder packets that are received out of order, identify lost error correction symbols, etc. For example, file delivery module 515 may identify sequence values stored within packets (e.g., packet headers, trailers, payloads, etc.) to identify missing sequence values, mis-ordered sequence values, etc. that file delivery module 515 uses to identify the dropped, delayed, and/or mis-ordered packets, the lost error correction symbols, etc. File delivery module 515 may provide the segments to FEC module 520 to be processed.

FEC module 520 may decode segments of data received from other modules, such as file delivery module 515, flute module 525, streaming module 530, etc. FEC module 520 may, for example, obtain error correction symbols from the segments and may perform forward error correction on the segments using the symbols to identify and/or correct errors within the segments. FEC module 520 may provide the decoded segments to application module 505.

FLUTE module 525 may perform one-way multicast file transfer via streaming media. FLUTE module 525 may, for example, detect a service announcement that indicates that content is available and may obtain, from the announcement, information that identifies a multicast channel (e.g., a multicast transport channel (MTCH), etc.) and/or port (e.g., a UDP port, etc.) from which the content may be received. FLUTE module 525 may also obtain error correction parameters to be used to process the content once received. Additionally, or alternatively, FLUTE module 525 may identify missing packets, segments, error correction symbols, etc. and may request that the missing packets, segments, error correction symbols, etc. be retransmitted. FLUTE module 525 may also, or alternatively, process retransmitted packets, segments, and/or error correction symbols and/or may ignore retransmitted packets, segments, etc. that were not identified, by user device 210, for retransmission. FLUTE module 525 may perform other functions in a manner similar to file delivery module 515 and may provide segments to FEC module 520 for decoding.

Streaming module 530 may process content, such as video content, that is being streamed to user device 210. Streaming module 530 may, for example, receive streamed content and may, on a near real-time basis, adapt to different data rates based on available bandwidth, radio conditions, etc. Streaming module 530 may, also, or alternatively, receive segments of data from the stream and may process the segments. Streaming module 530 may, for example, examine packets (e.g., headers, trailers, payload, etc.), within the segments, to identify dropped packets, mis-ordered packets, delayed packets, lost error correction symbols, and/or other conditions that may cause a user, of user device 210 to experience content that cannot be played and/or is distorted, blurred, frozen, etc. Streaming module 530 may provide the segments to FEC module 520 for decoding.

Transport module 535 may perform transport layer signaling that enables user device 210 to communicate with one or more devices of environment 200. Transport module 535 may, for example, use a transport layer protocol (e.g., TCP, UDP), etc.) to enable user device 210 to provide usage information and/or transmission information to feedback device 250. Additionally, or alternatively, transport module 535 may use a transport layer protocol to receive unicast content and/or multicast content from BMSC 240. Network module 540 may perform network layer signaling that enables user device 210 to communicate with one or more devices of environment 200. The network layer signaling may be based on an IP protocol (e.g., IP version 4 (IPv4), IPv6, etc.) to enable user device 210 to communicate with feedback device 250 to provide usage information and/or transmission information and/or to receive multicast content or unicast content from BMSC 240

Multicast module 545 may perform multicast signaling that enables user device 210 to communicate with one or more devices of environment 200. For example, multicast module 545 may perform multicast signaling to detect and/or process multicast announcements, to join a multicast address group (e.g., in response to a multicast announcement), to be removed from a multicast group, etc. Multicast module 545 may, in one example, perform the multicast signaling in a manner that conforms to an Internet Group Management Protocol (IGMP). Multicast module 545 may join or request to be removed from a multicast address group in response to an instruction received from application module 505.

Control module 550 may communicate with one or more modules to collect transmission information and/or usage information. Control module may represent logic implemented as hardware or a combination of hardware and software (e.g., such as a middleware application, etc.). Control module 550 may, for example, communicate with file delivery module 515 and/or FLUTE module 525 to collect transmission information that identifies a quantity of dropped packets, mis-ordered packets, lost error correction symbols, etc. associated with a file being downloaded to user device 210. Control module 550 may also, or alternatively, communicate with FEC module 520 to collect transmission information that identifies segments of files, video content, etc. that cannot be decoded (e.g., due to lost FEC symbols, etc.). Control module 550 may also, or alternatively, communicate with streaming module 515 to collect transmission information that identifies a quantity of dropped packets, mis-ordered packets, lost error correction symbols, etc. associated with streamed content being received by user device 210.

Additionally, or alternatively, control module 550 may communicate with framework module 510, application module 505, and/or multicast module 545 to collect usage information that identifies which content is being played or displayed on user device 210, to which channel (e.g., unicast channel, multicast channel, etc.) user device 210 is tuned, a duration that user device 210 tuned to each channel, etc. Control module 550 may also, or alternatively, communicate with framework module 510 and/or application module 505 to collect usage information that identifies a quantity of time a frame of content could not be played on user device 210 (sometimes referred to as a frozen frame), a duration of time associated with the frozen frame, etc.

Additionally, or alternatively, control module 550 may monitor communication interface 460 (FIG. 4) to collect transmission information that identifies radio conditions being experienced by user device 210, such as power level, a signal-to-noise ratio (SNR), signal-to-interference noise ratio (SINR), channel isolation, etc. Control module 550 may also, or alternatively, communicate with transport module 535 and/or network module 540 to provide transmission information and/or or usage information to feedback device 250.

Although FIG. 5A shows example functional components of user device 210, in other implementations, user device 210 may include fewer functional components, different functional components, differently arranged functional components, or additional functional components than depicted in FIG. 5A. Additionally, or alternatively, one or more functional components of user device 210 may perform one or more tasks described as being performed by one or more other functional components of user device 210.

FIG. 5B is a diagram of example functional components of feedback device 250. Each of the functional blocks, shown in FIG. 5B, may be implemented by one or more of the components described with regard to FIG. 4 (e.g., by processing unit 420 executing instructions stored in memory 430). As shown in FIG. 5B, feedback device 250 may include a transmission module 560, a retransmit module 565, and a usage module 570.

Transmission module 560 may process transmission information received from user device 210. For example, transmission module 560 may receive, from user device 210, transmission information associated with streaming multicast content being received by user device 210 and/or other user devices 210. Transmission module 560 may also, or alternatively, identify a quantity of lost error correction symbols and/or a quantity of dropped, mis-ordered, and/or delayed packets, associated with the streaming multicast content, based on the transmission information. Transmission module 560 may additionally, or alternatively, identify a condition associated with the streamed multicast content when the quantity of lost error correction symbols is greater than a first threshold and/or when the quantity of dropped, mis-ordered, and/or delayed packets is greater than a second threshold. In one example, transmission module 560 may remedy the condition by instructing BMSC 240 to increase FEC overhead (e.g., by increasing a quantity of error correction symbols per segment of data) associated with the multicast content being streamed to user device 210 and/or other user devices 210.

Additionally, or alternatively, transmission module 560 may remedy the condition by instructing eNodeB 220 to change a MCS value being used to stream the multicast content. Changing the MCS value may cause transmission parameters (e.g., a type of modulation, a data rate, a channel bandwidth, etc.), associated with the streamed multicast content, to change in manner that remedies the condition. Transmission module 560 may determine whether to instruct BMSC 240 to increase FEC overhead and/or other parameters and/or to instruct eNodeB 220 to change the MCS value and/or other parameters based on whether a quantity of user devices 210, that are receiving streamed multicast content with which a condition is associated, is greater than a threshold.

Additionally, or alternatively, transmission module 560 may determine, in a manner similar to that described above, whether a condition is associated with multicast data (e.g., a multicast file, image, document, etc.) that is being downloaded to user device 210 and/or other user devices 210 based on transmission information. When a condition is associated with the multicast file, transmission module 560 may communicate with retransmit module 565 to retransmit all or a portion of the multicast file.

Retransmit module 565 may cause content, with which a condition is associated, to be retransmitted to user device 210 based on transmission information received from user device 210. For example, retransmit module 565 may identify all or a portion of a file (e.g., based on one or more packets, segments, etc.) that is to be retransmitted to user device 210 based on an instruction received from transmission module 560 and/or a request received from user device 210. Retransmit module 565 may also, or alternatively, identify a quantity of other user devices 210 that are to receive all or the portion of the file. When the quantity of user devices 210 is greater than a threshold, retransmit module 565 may instruct BMSC 240 to retransmit all or the portion of the file, to user devices 210, via a multicast channel. When the quantity of user devices 210 is not greater than the threshold, retransmit module 565 may instruct BMSC 240 to retransmit all or the portion of the file, to user devices 210, via one or more unicast channels.

Usage module 570 may process usage information received from user device 210. Usage module 570 may receive, from transmission module 560, an indication that user devices 210, within a geographic area, are receiving streaming multicast content (e.g., video content, etc.) with which a condition is associated. Usage module 570 may also, or alternatively, retrieve usage information associated with one or more user devices 210 within the geographic area that identifies a portion of user devices 210 that are tuned to receive the content with which the condition is associated. When a quantity of user devices 210, which are tuned to receive the multicast content with which the condition is associated, is greater than a threshold, usage module 570 may instruct BVPS 260 to change pre-configured parameters that are being used to provision the streaming multicast content to user devices 210 within the geographic area. In one example, the instruction may cause BVPS 260 to change a first parameter that identifies an amount of FEC overhead that is to be used, by BMSC 240, to provision the multicast content to remedy the condition. Additionally, or alternatively, the instruction may cause BVPS 260 to change a second parameter that identifies a quantity of radio resources (e.g., data rate, bandwidth, etc.), associated with eNodeB 220, to be allocated to provision the multicast content to remedy the condition. Additionally, or alternatively, the instruction may cause BVPS 260 to change a third parameter (e.g., a MCS value) that identifies transmission parameters (e.g., a type of modulation, a data rate, a channel bandwidth, etc.), that eNodeB 220 is to use to provide the multicast content in a manner that remedies the condition.

Although FIG. 5B shows example functional components of feedback device 250, in other implementations, feedback device 250 may include fewer functional components, different functional components, differently arranged functional components, or additional functional components than depicted in FIG. 5B. Additionally, or alternatively, one or more functional components of feedback device 250 may perform one or more tasks described as being performed by one or more other functional components of feedback device 250.

Figure 6:
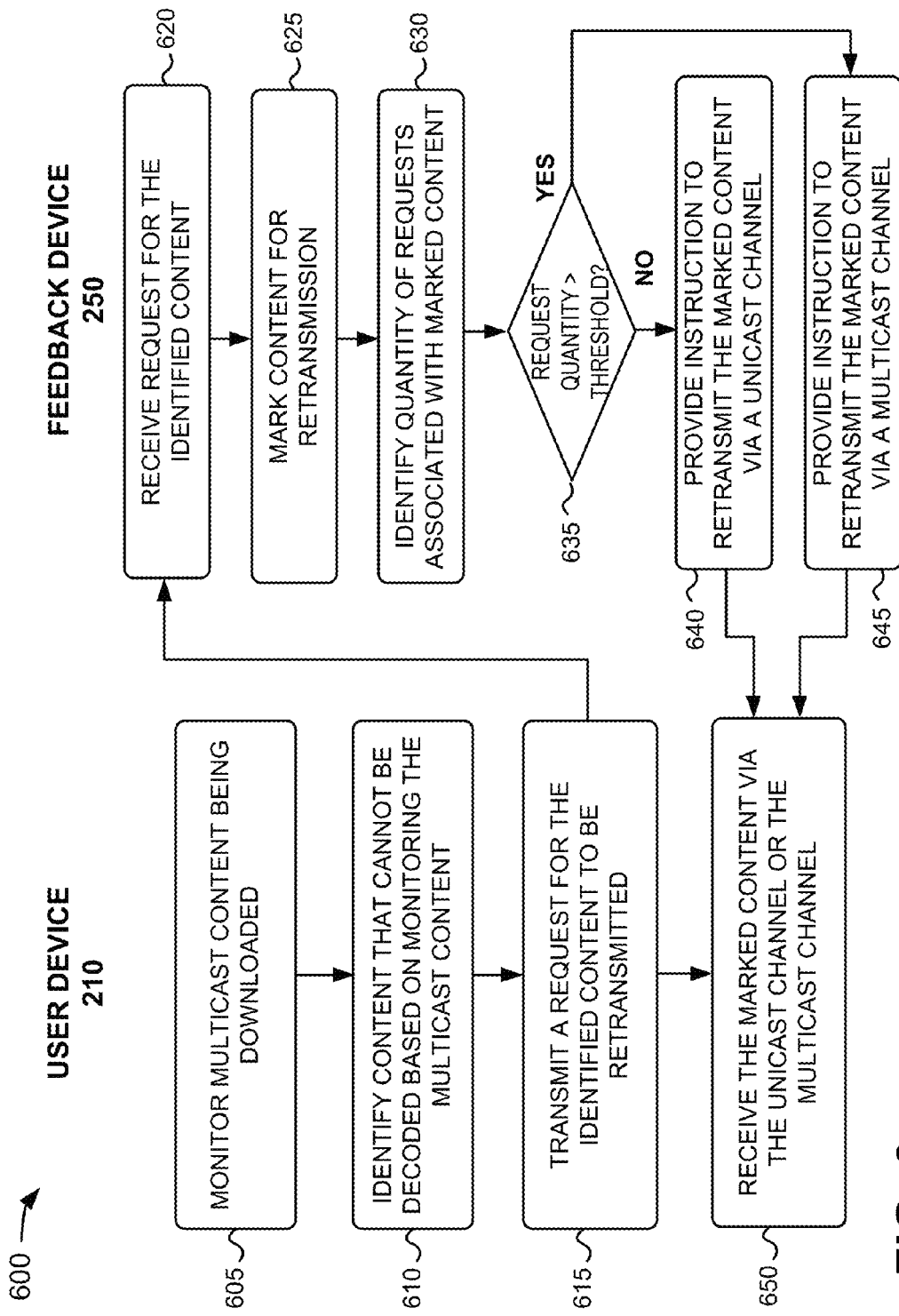
FIG. 6 is a flow chart of an example process for retransmitting downloaded content based on feedback received from a user device.

FIG. 6 is a flow chart of an example process 600 for retransmitting downloaded content based on feedback received from user device 210. In one example implementation, process 600 may be performed by user device 210 and feedback device 250. Additionally, or alternatively, some or all of process 600 may be performed by another device or group of devices, including or excluding user device 210 and feedback device 250.

As shown in FIG. 6, process 600 may include monitoring multicast content being downloaded (block 605) and identifying content that cannot be decoded based on monitoring the multicast content (block 610). For example user device 210 may download multicast content (e.g., data, a file, an image, a webpage, etc.) and may examine packets (e.g., headers, trailers, payloads, etc.) associated with the multicast content. User device 210 (e.g., control module 550) may, as described above and as a result of examining the packets, collect transmission information (e.g., from one or more of file delivery module modules 505 through 545) associated with downloading multicast content. In one example, user device 210 may collect transmission information that identifies a portion of the multicast content (e.g., one or more packets, segments, etc.) that cannot be decoded, such as when a quantity of errors is greater than error correction capacity of user device 210 (e.g. FEC module 520). Additionally, or alternatively, user device 210 may collect transmission information that identifies a quantity of lost error correction symbols within one or more segments of the multicast content (e.g., percent symbol loss). Additionally, or alternatively, user device 210 may collect transmission information that identifies a quantity of dropped, delayed, and/or mis-ordered packets within one or more segments of the multicast content.

As also shown in FIG. 6, process 600 may include transmitting a request for the identified content to be retransmitted (block 615). For example, user device 210 may transmit, to feedback device 250, a request for the identified content to be retransmitted to user device 210. The request may, for example, include information that identifies the content that cannot be decoded and/or with which the missing symbols, dropped packets, etc. are associated. In one example, the request may include one or more sequence values that correspond to packets and/or segments of the content that cannot be decoded. Additionally, or alternatively, the request may include one or more sequence values that correspond to the lost error correction symbols and/or the dropped, mis-ordered, and/or delayed packets. Additionally, or alternatively, user device 210 may transmit, to feedback device 250, the transmission information in addition to, or instead of, the request.

As further shown in FIG. 6, process 600 may include receiving the request for the identified content (block 620), marking content for retransmission (block 625), and identifying a quantity of requests associated with the marked content. For example, feedback device 250 (e.g., retransmit module 565) may receive the request for the identified content and may, based on the request, identify the portion of the content to be retransmitted (e.g., based on the sequence numbers obtained from the request). Additionally, or alternatively, feedback device 250 may identify a portion of the multicast content (e.g., one or more blocks of data) that corresponds to the sequence values and may mark the portion of the multicast content by setting a flag and/or associating a value with the portion of the multicast content. The value may correspond to a quantity of times the marked content has been requested (e.g., based on a counter or some other scheme).

Additionally, or alternatively, feedback device 250 (e.g., transmission module 560) may determine that a condition is associated with the multicast content (e.g., the identified portion of the multicast content) based on a determination that a quantity of lost forward error correction symbols, obtained from the transmission information, is greater than a first threshold. Feedback device 250 may also, or alternatively, determine that a condition is associated with the multicast content based on a determination that a quantity of dropped packets, mis-ordered packets, and/or delayed packets, obtained from the transmission information, is greater than a second threshold.

Additionally, or alternatively, feedback device 250 may identify a quantity of requests for the marked content that have been received from user device 210 and/or other user devices 210 as a result of receiving the request and/or based on the determination that a condition is associated with the multicast content. In one example, feedback device 250 may identify the quantity of requests for the marked content based on a quantity of times the flag has been set and/or the value associated with the marked content. Additionally, or alternatively, feedback device 250 may retrieve, from a memory associated with feedback device 250, information that identifies requests, for the marked content, that were previously received, during a time period, from other user devices 210. Feedback device 250 may identify the quantity of requests based on the information that identifies the requests that were previously received.

If the request quantity is not greater than a threshold (block 635—NO), process 600 may include providing an instruction to retransmit the marked content via a unicast channel (block 640). For example, feedback device 250 may determine that the quantity of requests for the marked content is not greater than a threshold. When the quantity of requests is not greater than the threshold, feedback device 250 may instruct BMSC 240 to provide the marked content, as unicast content, to user device 210. BMSC 240 may, based on the instruction, retransmit the marked content to eNodeB 220 with an instruction that the marked content is to be transmitted, to user device 210, via a unicast channel. BMSC 240 may, for example, obtain the marked content from content provider 270 when the marked content is not stored in a memory associated with BMSC 240. Additionally, or alternatively, feedback device 250 may instruct BMSC 240 to provide the marked content, as unicast content, to other user devices 210. BMSC 240 may, based on the instruction, retransmit the marked content to one or more eNodeBs 220 with an instruction that the marked content is to be transmitted, to the other user devices 210, via one or more unicast channels.

If the request quantity is greater than the threshold (block 635—YES), process 600 may include providing an instruction to retransmit the marked content via a multicast channel (block 645). For example, feedback device 250 may determine that the quantity of requests for the marked content is greater than the threshold. When the quantity of requests is greater than the threshold, feedback device 250 may instruct BMSC 240 to provide the marked content, as multicast content, to user device 210 and/or the other user devices 210. BMSC 240 may, based on the instruction, retransmit the marked content to one or more eNodeBs 220 with an instruction that the marked content is to be transmitted, to user device 210 and/or the other user devices 210, via a multicast channel.

As also shown in FIG. 6, process 600 may include receiving the marked content via the unicast channel or the multicast channel (block 650). For example, user device 210 may receive the marked content as unicast content or multicast content. User device 210 may process the marked content and may integrate the processed marked content with the content previously downloaded to and/or processed by user device 210.

FIG. 7 is a flow chart of an example process 700 for improving streaming content quality based on feedback received from user device 210. In one example implementation, process 700 may be performed by user device 210 and feedback device 250. Additionally, or alternatively, some or all of process 700 may be performed by another device or group of devices, including or excluding user device 210 and feedback device 250.

As shown in FIG. 7, process 700 may include receiving streaming multicast content (block 710), obtaining transmission information associated with the received multicast content (block 720), and transmitting the transmission information (block 730). For example, user device 210 may receive streaming multicast content (e.g., as streaming video, streaming audio, etc.) and may examine packets (e.g., headers, trailers, payloads, etc.) associated with the multicast content.

User device 210 (e.g., control module 550) may, as described above and as a result of examining the packets, collect transmission information (e.g., from one or more of modules 505 through 545) associated with the streaming multicast content. In one example, user device 210 may collect transmission information that identifies a quantity of dropped packets, mis-ordered packets, delayed packets, etc. associated with one or more segments of the multicast content (e.g., % packet loss, etc.). Additionally, or alternatively, user device 210 may collect transmission information that identifies a quantity of lost error correction symbols associated with one or more segments of the multicast content (e.g., percent symbol loss). User device 210 may also, or alternatively, collect transmission information that identifies radio conditions associated with receiving the multicast content (e.g., signal power level, a SNR, a SINR, a quantity of channel isolation, etc.). User device 210 may transmit the transmission information to feedback device 250. In one example, user device 210 may transmit the transmission information, to feedback device 250, via a unicast channel.

As also shown in FIG. 7, process 700 may include receiving the transmission information (block 740) and identifying a condition associated with the received multicast content based on the transmission information (block 750). For example, feedback device 250 (e.g., transmission module 560) may receive the transmission information from user device 210 and may determine whether a condition is associated with the multicast content being received by user device 210. Feedback device 250 may, for example, determine whether a quantity of lost error correction symbols, identified by the transmission information, is greater than a first threshold. When the quantity of lost error correction symbols is greater than the first threshold, feedback device 250 may determine that a condition is associated with the multicast content. Feedback device 250 may also, or alternatively, determine that there is no condition when the quantity of lost error correction symbols is not greater than the first threshold. Similarly, when a quantity of dropped, mis-ordered, and/or delayed packets, identified by the transmission information, is greater than a second threshold, feedback device 250 may determine that a condition is associated with the multicast content. Feedback device 250 may also, or alternatively, determine that there is no condition when the quantity of dropped, mis-ordered, and/or delayed packets is not greater than the second threshold.

Additionally, or alternatively, feedback device 250 may determine whether a condition is associated with the multicast content based on radio conditions identified by the transmission information. Feedback device 250 may, for example, determine whether an amount of signal strength (e.g., a signal power level, a SNR, a SINR, channel isolation, etc.), associated with the multicast content, is less than a signal strength threshold. When the amount of signal strength is less than the signal strength threshold, feedback device 250 may determine that a condition is associated with the multicast content. Feedback device 250 may also, or alternatively, determine that there is no condition when the amount of signal is not less than the signal strength threshold.

As further shown in FIG. 7, process 700 may include identifying a quantity of user devices receiving the multicast content with which a condition is associated (block 760) and providing an instruction to adjust a streaming parameter of the multicast content when the quantity of user devices is greater than a threshold (block 770). For example, feedback device 250 (e.g., usage module 570) may retrieve, from a memory associated with feedback device 250, usage information previously received from user devices 210 within a geographic area that is served by eNodeB 220 via which user device 210 is receiving the multicast content. Feedback device 250 may identify user devices 210, within the geographic area, which are tuned to the multicast content.

Feedback device 250 may determine whether a quantity of user devices 210, which are tuned to the multicast content, is greater than a threshold. When the quantity of user devices 210 is not greater than the threshold, feedback device 250 may not cause transmission parameters, associated with the multicast content, to be modified. When the quantity of user devices 210 is greater than the threshold, feedback device 250 may cause transmission parameters, associated with the multicast content, to be modified.

Feedback device 250 may, for example, remedy the condition by instructing BMSC 240 to increase FEC overhead (e.g., by increasing a quantity of error correction symbols per segment of data) associated with the multicast content being streamed to user device 210 and/or other user devices 210. BMSC 240 may receive the instruction and may increase a quantity of error correction symbols within each segment of the multicast content being streamed to user device 210 and/or user devices 210, within the geographic area, that are tuned to the multicast content. Additionally, or alternatively, feedback device 250 may remedy the condition by instructing eNodeB 220 to modify transmission parameters (e.g., a type of modulation, a data rate, a channel bandwidth, etc.) associated with the streamed multicast content. In one example, feedback device 250 may instruct eNodeB 220 to change a MCS value (e.g., by increasing or decreasing the MCS value) used to stream the multicast content, which may cause the transmission parameters to change. eNodeB 220 may receive the instruction and may modify the transmission parameters used to stream the multicast content to user device 210 and/or user devices 210, within the geographic area, that are tuned to the multicast content.

As still further shown in FIG. 7, process 700 may include receiving the streaming multicast content based on the adjusted streaming parameter (block 780). User device 210 may receive the multicast content that includes the increased quantity of error correction symbols. The increased quantity of error correction symbols may enable user device 210 to decode a greater quantity of packets and/or segments, associated with the multicast content, than were decoded prior to the increased quantity of error correction symbols. Decoding the greater quantity of packets and/or segments may remedy the condition associated with the multicast content and/or improve a user experience when the multicast content is played on user device 210. User device 210 may also, or alternatively, receive the multicast content being streamed to user device 210 based on the modified transmission parameters. The modified transmission parameters may reduce a quantity of lost error symbols and/or dropped, mis-ordered, and/or delayed packets to a level that remedies the condition associated with the multicast content, which may improve a user experience when playing the multicast content.

FIG. 8 is a flow chart of an example process 800 for collecting and providing usage information associated with user device 110. In one example implementation, process 800 may be performed by user device 210. Additionally, or alternatively, some or all of process 800 may be performed by another device or group of devices, including or excluding user device 210.

As shown in FIG. 8, process 800 may include monitoring one or more channels to which a user device is tuned during a session (block 810) and obtaining usage information associated with the session (block 820). For example, user device 210 (e.g., control module 550) may monitor one or more channels to which user device 210 is tuned over a time period during which user device 210 is receiving multicast content (e.g., downloaded files, streaming video, etc.) or unicast content. User device 210 may, for example, collect user information, associated with a session, that identifies a multicast channel and/or a unicast channel to which user device 210 is tuned during the time period. User device 210 may also, or alternatively, collect usage information that identifies a quantity of errors (e.g., a packet error rate (PER), etc.), a quantity of times that a video frame froze, a blank screen was displayed, etc. during the time period.

As also shown in FIG. 8, process 800 may include transmitting the usage information (block 830). For example, user device 210 may store the usage information in a memory associated with user device 210. User device 210 may also, or alternatively, transmit the usage information, to feedback device 250, in response to an instruction received from feedback device 250. In one example, user device 210 may transmit the usage information via a unicast channel. Additionally, or alternatively, user device 210 may automatically transmit the usage information to feedback device 250 when an instruction is not received from feedback device 250. In this example, the usage information may be transmitted based on a time interval (e.g., every 1 second, 10 seconds, 30 seconds, 1 minute, 10 minutes, 30 minutes, 1 hour, 12 hours, etc.), during off-peak hours (e.g., overnight, during non-work hours, etc.), and/or at a particular time of day (e.g., midnight, etc.).

FIG. 9 is a flow chart of an example process 900 for provisioning a multicast service based on feedback received from user device 210. In one example implementation, process 900 may be performed by feedback device 250 and BVPS 260. Additionally, or alternatively, some or all of process 900 may be performed by another device or group of devices, including or excluding feedback device 250 and BVPS 260.

As shown in FIG. 9, process 900 may include receiving transmission information associated with a multicast service being provisioned based on preconfigured transmission parameters (block 905) and identifying a condition, associated with the multicast service, based on the transmission information (block 910). For example, as described above, feedback device 250 (e.g., transmission module 560) may receive transmission information from user device 210. The transmission information may correspond to multicast content being provisioned to user device 210, by BVPS 260, based on preconfigured parameters. The preconfigured parameters may be specified by an operator of BVPS 260 and/or content provider 270 from which the multicast content is obtained. The preconfigured parameters may specify a FEC overhead to be used to provision the multicast content. The preconfigured parameters may also, or alternatively, specify transmission parameters to be used to provision the multicast content, such as a MCS value corresponding to a type of modulation, a data rate, a channel bandwidth, etc.

Additionally, or alternatively, feedback device 250 may, in a manner similar to that described above with respect to block 750, identify that a condition is associated with the multicast content based on the transmission information. The condition may, for example, be identified when a quantity of lost error correction symbols is greater than a first threshold and/or when a quantity of dropped, mis-ordered, and/or delayed packets is greater than a second threshold. The condition may also, or alternatively, be identified when an amount of signal strength, associated with a multicast channel via which the multicast content is being provisioned, is less than a signal strength threshold.

As also shown in FIG. 9, process 900 may include obtaining usage information associated with user devices in a service area, based on the identified condition (block 915). For example, as described above, feedback device 250 (e.g., usage module 570) may obtain usage information from other user devices 210 that are located within a geographic area to which the multicast content is provisioned and in which user device 210 is located (hereinafter referred to as a "service area"). Feedback device 250 may, for example, output an instruction to other user devices 210 to provide usage information that identifies to which channels (e.g., unicast channels, multicast channels, etc.) the other user devices 210 are tuned. The usage information may also identify a quantity of instances in which content, being played by the other user devices 210, becomes frozen, blurred, inoperable, etc. Feedback device 250 may receive the usage information, from the other user devices 210, as a result of the instruction. Additionally, or alternatively, feedback device 250 may retrieve, from a memory associated with feedback device 250, usage information that was previously received from the other user devices 210.

As also shown in FIG. 9, process 900 may include providing an instruction to change preconfigured parameters based on transmission information and usage information (block 920). For example, feedback device 250 may identify a first quantity of the other user devices 210 that are tuned to a multicast channel via which the multicast content is being provisioned based on the usage information. When the first quantity of the other user devices 210 is greater than a threshold, feedback device 210 may transmit an instruction, to BVPS 260, to change preconfigured parameters being used to provide the multicast service. Feedback device 250 may not provide the instruction when the first quantity of the other user devices 210 is not greater than the threshold.

Additionally, or alternatively, feedback device 250 may identify, based on the usage information, as a second quantity of the other user devices 210, a portion of the first quantity of the other user devices 210 that have played multicast content that becomes frozen, blurred, inoperable, etc. When the second quantity of the other user devices 210 is greater than another threshold, feedback device 210 may transmit an instruction, to BVPS 260, to change the preconfigured parameters being used to provide the multicast content. Feedback device 250 may not provide the instruction when the second quantity of the other user devices 210 is not greater than the other threshold.

Additionally, or alternatively, feedback device 250 may identify another service area that corresponds to the first quantity of the other user devices 210 and/or the second quantity of the other user devices 210. Feedback device 250 may also, or alternatively, identify one or more eNodeBs 220 that serve the portion of the one or more user devices 210 that are located within the other service area and may provide, to BVPS 260, information that identifies the other service area and/or the one or more eNodeBS 220 that server the other service area.

The instruction to change the preconfigured parameters may, for example, include an instruction to increase first FEC overhead used to provision the multicast content to the service area. Additionally, or alternatively, the instruction to change the preconfigured parameters may include an instruction to change first transmission parameters being used to provision the multicast content to the service area.

As further shown in FIG. 9, process 900 may include receiving the instruction to change the preconfigured parameters (block 925) and provisioning the multicast service based on changed parameters (930). For example, BVPS 260 may receive the instruction to change preconfigured parameters and may, as a result of the instruction, generate parameters that are different than the preconfigured parameters. The generated parameters may, for example, specify a second FEC overhead that is greater that the first FEC overhead. Additionally, or alternatively, the generated parameters may specify second transmission parameters that are different than the first transmission parameters. For example, the second transmission parameters may identify a MCS value that is not equal to a MCS value associated with the preconfigured parameters. Additionally, or alternatively, the second transmission parameters may specify a multicast channel bandwidth and/or data rate that is greater than a multicast channel bandwidth and/or data rate specified by the preconfigured parameters.

BVPS 260 may associate the generated parameters with multicast content that is to be provisioned, at a future time, to user devices 210 that are located within the service area. Associating the generated parameters with the multicast content that is scheduled to be provisioned, may prevent a condition from being associated with the multicast content that is scheduled to be provisioned at the future time. Additionally, or alternatively, BVPS 260 may cause the generated parameters to be used to provision multicast content that is currently being provisioned to user devices 210 that are located within the service area. In this example, BVPS 260 may provide the generated parameters to BMSC 240 to enable the multicast content to be transmitted to user devices 210 using the generated parameters. Additionally, or alternatively, BVPS 260 may provide the generated parameters to one or more eNodeBs 220, associated with the service area, to enable the multicast content to be transmitted to user devices 210 using the generated parameters. Provisioning the multicast content based on the generated parameters may remedy the condition associated with the multicast content. In one example, BVPS 260 may provide the generated parameters to one or more eNodeBs 220 that serve the other service area, identified by feedback device 250, to enable the multicast content to be transmitted to the one or more other user devices 210 based on the generated parameters.

Although FIGS. 6 through 9 show example blocks of processes 600 through 900, in other implementations, processes 600 through 900 may include additional blocks, different blocks, fewer blocks, and/or differently arranged blocks than those depicted in FIGS. 6 through 9. Additionally, or alternatively, one or more of the blocks of processes 600 through 900 may be performed in parallel.

Systems and/or methods described herein may provide multicast content to a user device based on feedback received from the user device. The feedback may identify information associated with the multicast content being received by the user device. The feedback may enable a condition, associated with the multicast content, to be detected and the multicast content to be provided, to the user device, in a manner that remedies the condition.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a user device, first multicast content;
obtaining, by the user device, transmission information associated with the first multicast content,
the transmission information identifying a quantity of lost error correction symbols associated with the first multicast content;
providing, by the user device and to a server device, the transmission information,
the transmission information enabling the server device to determine that a condition is associated with the first multicast content based on the quantity of lost error correction symbols satisfying a threshold and to remedy the condition by increasing a quantity of error correction symbols per segment of data; and receiving, by the user device, unicast content or second multicast content based on the condition being associated with the first multicast content, the unicast content or the second multicast content remedying the condition associated with the first multicast content.

2. The method of claim 1, where the first multicast content is stored by the user device; and where receiving the unicast content or the second multicast content further includes:

storing the unicast content by the user device; and processing the stored unicast content in a manner that replaces a portion of the first multicast content with which the condition is associated.

3. The method of claim 1, where the first multicast content is stored by the user device; and where receiving the unicast content or the second multicast content further includes:

storing the second multicast content by the user device; and processing the stored second multicast content in a manner that replaces a portion of the first multicast content with which the condition is associated.

4. The method of claim 1, where the first multicast content is received via a media stream; and where receiving the unicast content or the second multicast content further includes:

receiving, via the media stream, the second multicast content, the second multicast content being received instead of the first multicast content.

5. The method of claim 4, where the first multicast content and the second multicast content are received via a same multicast channel, the same multicast channel enabling the user device to receive the second multicast content without tuning to another multicast channel.

6. The method of claim 1, where the first multicast content is stored by the user device, and where the method further comprises:

identifying, based on the transmission information, a set of packets, of a plurality of packets associated with the first multicast content, that cannot be processed;

transmitting, to the server device, a request for the set of packets to be retransmitted to the user device;

receiving, based on the request, the retransmitted set of packets; and processing the retransmitted set of packets to remedy the condition associated with the first multicast content.

7. The method of claim 1, where the transmission information is provided, to the server device, via a unicast channel.

8. The method of claim 1, where obtaining the transmission information further includes:

monitoring packets, associated with the first multicast content, being received via a multicast channel; and obtaining the transmission information based on monitoring the packets, the transmission information further identifying at least one of:

a dropped packet, a packet that is received out-of-order, a delayed packet, a data rate associated with a portion of the multicast content, the multicast channel, a quantity of bandwidth associated with the multicast channel, or an amount of signal strength associated with the first multicast content.

9. The method of claim 1, further comprising:

obtaining usage information, associated with the user device, during a time period, the usage information identifying at least one of:

one or more channels to which the user device is tuned during the time period, a respective period of time that the user device is tuned to each of the one or more channels during the time period, content played on the user device during the time period, or a quantity of instances, during the time period, that the user device could not play the content; and providing the usage information to the server device, the usage information enabling the server device to determine whether to cause content to be transmitted as unicast content or multicast content.

10. A system comprising:

one or more devices to:

transmit, to a user device, multicast content using first parameters, obtain, from the user device, transmission information associated with the multicast content, the transmission information identifying a quantity of lost error correction symbols associated with the multicast content, determine that the quantity of lost error correction symbols satisfies a threshold, identify that a condition is associated with the multicast content based on the quantity of lost error correction symbols satisfying the threshold, increase, to remedy the condition, a quantity of error correction symbols per segment of data;

generate second parameters when the condition is associated with the multicast content, the second parameters being different than the first parameters, and transmit, to the user device, the multicast content using the second parameters, the multicast content being transmitted, using the second parameters, causing the condition to be remedied.

11. The system of claim 10, where, when generating the second parameters, the one or more devices are to:

identify a first amount of forward error correction (FEC) overhead, associated with the multicast content, that is greater than a second amount of FEC overhead identified by the first parameters; and transmit, to the user device, the multicast content based on the first amount of FEC overhead.

12. The system of claim 10, where, when generating the second parameters, the one or more devices are to:

identify a first modulation control scheme (MCS) value, associated with the multicast content, that is different than a second MCS value identified by the first parameters, the first MCS value corresponding to at least one of:

a first type of modulation that is different than a second type of modulation identified by the first parameters, a first data rate that is greater than a second data rate identified by the first parameters, or a first channel bandwidth that is greater than a second channel bandwidth identified by the first parameters, and transmit, to the user device, the multicast content based on the first MCS value.

13. The system of claim 12, where, when transmitting the multicast content based on the first MCS value, the one or more devices are to:

transmit, to a wireless transmission device, information indicating that the multicast content is to be provided to the user device based on the first MCS value.

14. The system of claim 10, where the one or more devices are further to:

identify a service area in which the user device is located and to which the multicast content is being provisioned when the condition is associated with the multicast content;

obtain usage information from a plurality of other user devices that are located within the service area;

identify, based on the usage information, one or more other user devices, of the plurality of other user devices, that are tuned to a channel via which the multicast content is being provisioned; and transmit, to the one or more other user devices, the multicast content using the second parameters.

15. The system of claim 14, where the one or more devices are further to:

identify another service area in which the one or more other user devices are located; and transmit, to the one or more user devices, the multicast content, using the second parameters, via one or more wireless transmission devices that serve the other service area.

16. The system of claim 10, where the one or more devices are further to:

associate the second parameters with other multicast content that is scheduled to be provisioned to the user device, or a plurality of other user devices, at a future point in time.

17. A method comprising:

transmitting, by one or more devices, content to be downloaded by a user device, of a plurality of user devices, via a multicast channel;

increasing, by the one or more devices, a quantity of error correction symbols per segment of data to remedy a condition associated with the content;

receiving, by the one or more devices and from the user device, a request to retransmit a portion of the content;

identifying, by the one or more devices, a quantity of other requests, to retransmit the portion of the content, received from one or more other user devices, of the plurality of user devices, that are downloading the content;

determining, by the one or more devices, whether the quantity of other requests is greater than a threshold; and retransmitting, by the one or more devices and to the user device or the one or more other user devices, the portion of the content, via a unicast channel, when the quantity of other requests is not greater than the threshold.

18. The method of claim 17, further comprising:

retransmitting, by the one or more devices and to the user device or the one or more other user devices, the portion of the content, via the multicast channel, when the quantity of other requests is greater than the threshold.

19. The method of claim 17, where increasing the quantity of error correction symbols per segment of data comprises:

receiving, from the user device, transmission information associated with the content, the transmission information identifying parameters or radio conditions under which the content is received by the user device;

determining that the condition is associated with the content based on the transmission information; and increasing the quantity of error correction symbols per segment of data based on determining that the condition is associated with the content.

20. The method of claim 19, further comprising:

obtaining usage information from the plurality of user devices, the usage information identifying the one or more other user devices, of the plurality of user devices, that are downloading the content via the multicast channel; and transmitting, to the user device or the one or more other user devices, the content based on the increased quantity of error correction symbols per segment of data when a quantity of the one or more other user devices, downloading the content via the multicast channel, is greater than another threshold.

\* \* \* \* \*